(Model.)
A. SCOTT.
ROTATIVE SPEED REGULATING MECHANISM.
No. 444,136. Patented Jan. 6, 1891.
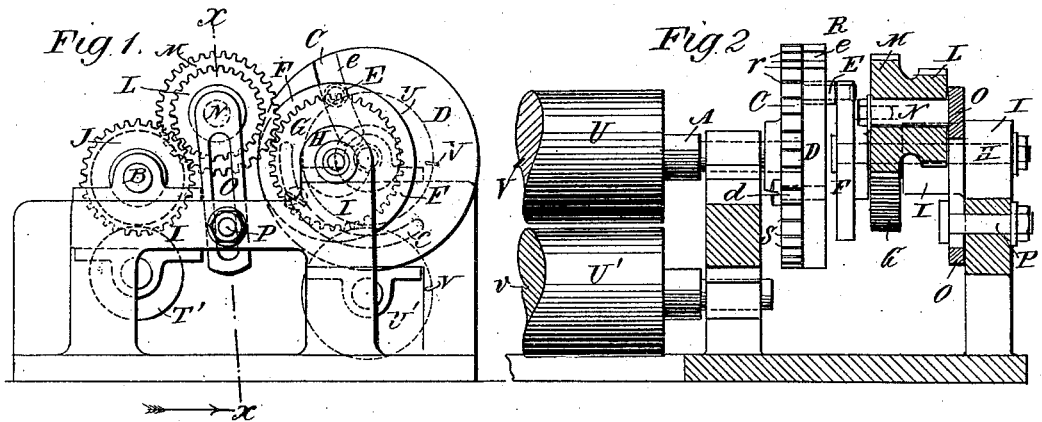
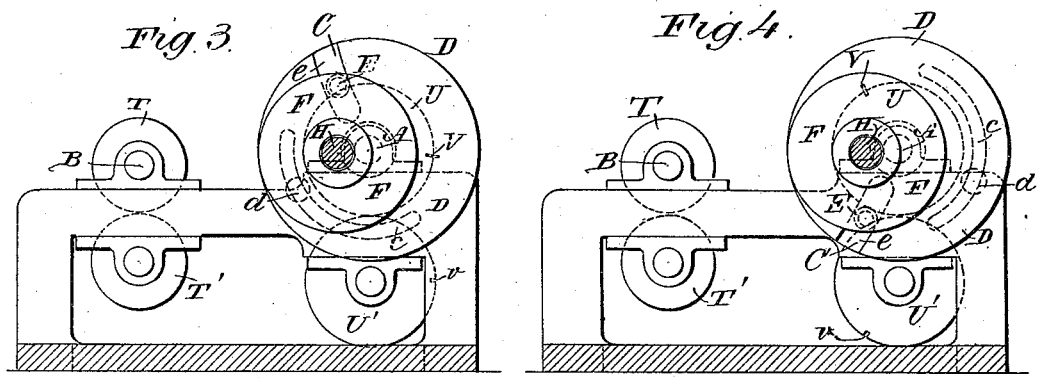
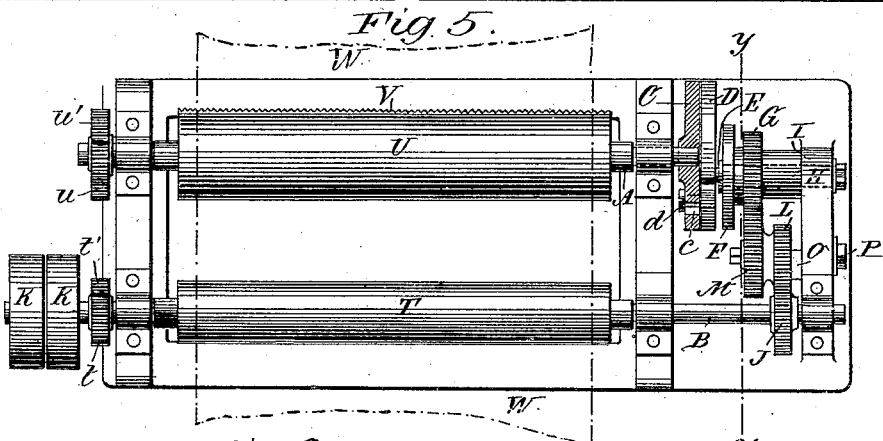
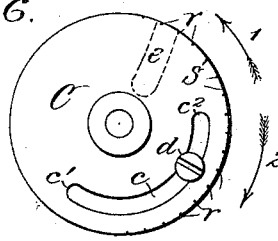
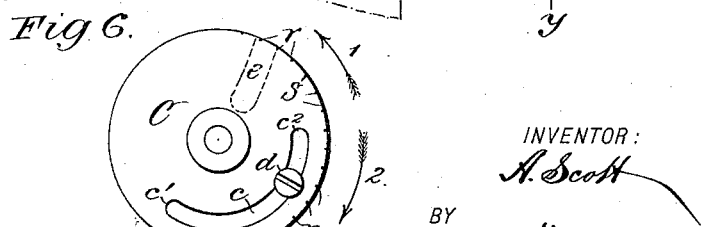
WITNESSES:
Paul Johst
C. Sedgwick
INVENTOR:
A. Scott
BY
Munn & Co
ATTORNEYS.

UNITED STATES PATENT OFFICE.

ARTHUR SCOTT, OF PLAINFIELD, NEW JERSEY, ASSIGNOR TO WALTER SCOTT, OF SAME PLACE.

ROTATIVE SPEED-REGULATING MECHANISM.

SPECIFICATION forming part of Letters Patent No. 444,136, dated January 6, 1891.

Application filed September 17, 1889. Serial No. 324,208. (Model.)

*To all whom it may concern:*

Be it known that I, ARTHUR SCOTT, of Plainfield, in the county of Union and State of New Jersey, have invented a new and Improved Rotative Speed-Regulating Mechanism, of which the following is a full, clear, and exact description.

My invention relates to a differential gearing for regulating rotative speeds and adapted more especially for application to roller-machines for cutting a web of paper or other material fed at varying speeds to the cutting mechanism.

The object of the invention is to allow such regulation of the speed of the driven shaft that any given point of its periphery shall at a certain instant travel at the same speed as the driving-shaft whether the latter be rotated faster or slower and as the mechanism connected to the driven shaft shall require to produce any finished product.

The invention will first be described, and then will be particularly pointed out in the claims.

Reference is to be had to the accompanying drawings, forming a part of this specification, in which similar letters of reference indicate corresponding parts in all the figures.

Figure 1 is an end view of a paper-cutting machine embodying my invention. Fig. 2 is a front view of one end of the machine, showing the paper-cutting rollers, and with the frame and speed-regulating mechanism in vertical section on the line $x\ x$ in Fig. 1. Fig. 3 is an end view with the speed-regulating mechanism partly removed and in transverse section on the line $y\ y$ in Fig. 5. Fig. 4 is a like view showing different relative positions of the parts. Fig. 5 is a plan view of the machine and speed-regulating mechanism with parts broken away and in section; and Fig. 6 is an inner face view mainly of the inner graduated disk of the speed-regulating mechanism.

I will first particularly describe the speed-regulating mechanism as applied to two adjacent shafts A B journaled for rotation in any suitable bearings.

On the shaft A is keyed or otherwise fixed a disk plate C, which is provided with a segmental concentrically-arranged slot $c$, through which passes a set or clamp screw $d$, which enters another disk plate D, which is mounted loosely on said shaft A and is provided with a radial slot $e$, which is slightly curved and is shown opening to the margin of the disk. This slot $e$ receives a pin or an anti-friction roller placed loosely on a pin E, which is fixed to and projects laterally from a disk or plate F, or it may be an arm, which is provided with or fixed to a gear-wheel G, and both parts F and G are mounted so as to turn freely on or with a shaft H, which is sustained in suitable bearing or bearings I, mounted on a proper support, which in the drawings is the base or bed plate of the paper-cutting machine. The shaft H preferably stands in about the same horizontal plane as the shaft A, but is set to one side of it, thereby holding the disk plate or arm F eccentrically with relation to the two disk plates D C on the shaft A, and as most clearly shown in Figs. 1, 3, and 4 of the drawings.

On the shaft B is held a gear-wheel or pinion J, and also driving-pulleys K K, one fast and the other loose, and whereby rotation may be given the shaft B at any required speed, and the wheel J may impart rotation to the pinion or gear-wheel G through intermediate gearing next described. This gearing consists, preferably, of two gear-wheels or pinions L M, fixed or formed together or arranged to rotate together on or with a shaft N, which is held to a vertically and laterally adjustable slotted arm O, which is secured in any required position to the bearing I by a bolt P or other clamping device, allowing convenient adjustment of various sizes of gear-wheels L M, carried by the shaft N, to hold them into engagement with the wheels J G, above mentioned. By different relative adjustments of the gearing J L G different rotative speeds may obviously be given the plate F, having the roller-pin E, from the driving-shaft B. There will preferably be several pairs of gear-wheels or pinions L M, each pair themselves differing in diameter and number of teeth, and each pair being of different sizes or larger or smaller than every other pair, to provide for a number of different speeds of the plate F from the driving-shaft, as occasion may require.

The periphery of the loose disk D is provided with a gage-mark R, or it may be a pointer of any kind, which may be set to any mark r of a graduated scale S formed or produced on the periphery of the disk C, which is fast on the driven shaft A, for adjusting the rotative speed of this shaft, so that any given point or line along its periphery or along the periphery of a roller held thereto shall at a certain instant travel at the same speed of rotation as the periphery of the shaft B, or a roller fixed thereto, and as will be hereinafter more fully explained.

I show the improved differential rotative speed-regulating mechanism applied to a paper-cutting machine made with a front pair of paper-web-feed rollers T T', the former fixed to the driving-shaft B and the latter held to a shaft below it in a suitable frame, both rollers being geared together by a pair of gear-wheels or pinions $t$ $t'$ on their respective shafts. Behind the feed-rollers there is a pair of paper-cutting rollers U U', one fixed to the driven shaft A and the other to a shaft below it, both shafts being geared together by a pair of gear-wheels or pinions $u$ $u'$ to compel a knife or cutter V, held to the upper roller U, to always register with or enter a longitudinal groove $v$ in the lower roller irrespective of the speed of rotation of the roller.

The operation is as follows: When the knife V of the paper-cutter is engaged with the opposing roller-groove $v$, as when cutting the paper, and the screw $d$ is loosened and the disk D is turned until said screw strikes the end $c'$ of the slot $c$ of the disk C, the pin E of the disk F will be at the outer end of the slot $e$ of the disk D, and when the disk D is turned the other way to carry its screw $d$ around into contact with the other end $c^2$ of the slot $c$ of the disk C the pin E will then be at the inner end of the slot $e$. In the former case the roller U will be rotated at its slowest speed as the knife V enters the groove $v$, and in the latter case the roller U will be rotated at its fastest speed as the knife enters the groove. In intermediate positions of the screw $d$ in the slot $c$ the knife-carrying roller will be turned at different speeds as the knife enters the groove of the opposing roller. This variable speed of rotation of the shaft A and the knife held thereto is caused by the eccentricity of the shaft H of the pin-carrying disk F relatively with the shaft A and the adjustment of the disk D relatively with the disk C, as above described. Figs. 3 and 4 of the drawings illustrate one relative adjustment of the parts and indicate that while the pin E turns about one-half way around, or from the position shown in Fig. 3 to that shown in Fig. 4, the knife V travels about one-third the circumference of the roller, or quite slowly, and as the pin completes the revolution or returns to the position shown in Fig. 3 the knife V moves much faster, or through an arc compassing about two-thirds of the circumference of the roller. When cutting a paper web W into intermediate lengths possible with any pair of gears L M, adjusted to the shaft N and meshed with the gear-wheels J G, the mark or pointer R of the disk D will be set about at the central graduation $r$ of the scale S on the disk C, and the disks D C will then be clamped by the screw $d$. As the paper is fed along by and between the rolls T T' the rolls U U' will also be rotated, and the position which the pin E of the disk F has in the radial slot $e$ of the disk D relatively with the position of the knife V in the roll U, notwithstanding the variable speed of travel of the periphery of said roll, will bring the knife into the groove $v$ of the roll U' at precisely the speed of travel of the peripheries of the feed-rolls, which is the speed of travel of the paper web. Consequently the paper will be cut off clean and at the right place, which would not be possible were the knife traveling faster or slower than the paper, as in the former case the knife would tear through the paper more or less, and in the latter case the paper would bunch or belly up or down between the feed and cutting rolls and would be cut off at the wrong place or would choke the machine. If now the paper is to be cut into longer lengths than is possible with the same gearing L M, the screw $d$ will be loosened and the disk D will be turned over backward in direction of the arrow 1 in Fig. 6 of the drawings to set another graduation $r$ to the mark R on the disk D, and the screw $d$ will again be tightened. When the machine is again started, after changing the gears L M to make the feed-rolls run faster to feed the paper web through quicker, the variable speed of the cutting-rolls will be so controlled that the instant the knife V enters the paper and the groove $v$ the knife will be traveling at the same speed as the paper and will sever it smoothly. If the paper is to be cut into lengths shorter than the intermediate lengths possible with the same gearing L M, the disk D will be turned over forward in direction of the arrow 2 in Fig. 6, and by this adjustment and when the speed of the feed-rollers is changed to run slower by changing the gears L M the knife V at the instant of cutting the paper will travel at the same slower speed of the paper and will cut it off into regular shorter lengths. When different sizes of gearing L M are adjusted to the speed-regulating mechanism, several other lengths of paper may be cut, so that with three or four changes of gears L M about twenty different lengths of paper may be cut—say from twelve to thirty inches long, more or less. The graduations $r$ of the scale S on the disk C will be so marked off relatively with and so identified by marks on the interchangeable gearing employed that by consulting a table any one may easily set the gearing and speed-regulating mechanism to provide for cutting any desired lengths of paper within the capacity of the machine.

Interchangeable gears of any suitable class may be used between the driving-shaft gear J and the speed-mechanism gear G to impart variable rotative speeds to the shaft A and any mechanism connected therewith, as will readily be understood.

I do not claim the combination, with the feeding-rolls and changeable gears for feeding in a greater or less length of paper at each movement of the press and a cutter for separating the paper, of a crank connected with the axis of the cutter, a wheel or ring occupying an eccentric position to the axis of the crank, and gearing for imparting motion to the crank and ring or wheel. Neither do I claim the combination, with the feeding and cutting mechanism in a web-printing press, of changeable gearing to vary the paper-feed, a differential crank mechanism between the gearing of the printing-press and the cutter, and an index to denote the relative positions of the parts in the differential crank mechanism as they may be adjusted to adapt the speed of movement of the cutter to that of the paper.

Having thus fully described my invention, I claim as new and desire to secure by Letters Patent—

1. In rotative speed-regulating mechanism, the combination, with driven and driving-shafts, of a plate loose on the driven shaft and provided with a radial slot, means, substantially as specified, for coupling it to said driven shaft, an intermediate shaft set eccentrically to the driven shaft, a plate or arm on said intermediate shaft and provided with a pin entering the radial slot of the loose plate on the driven shaft, and gearing connecting the pin-carrying plate or arm with the driving-shaft, substantially as described, whereby any given point of the periphery of the driven shaft may be caused at a certain instant to travel at the same speed as the driving-shaft irrespective of the speed of the latter, as herein set forth.

2. In rotative speed-regulating mechanism, the combination, with driven and driving shafts, of a plate fixed to the driven shaft, an adjacent plate loose on said shaft and provided with a radial slot, means for holding the two plates together in different relative positions, an intermediate shaft set eccentrically to the driven shaft, a plate or arm on said intermediate shaft and provided with a pin entering the radial slot of the plate on the driven shaft, and gearing connecting the pin-carrying plate or arm with the driving-shaft, substantially as described, for the purposes set forth.

3. In rotative speed-regulating mechanism, the combination, with the driven shaft A and driving-shaft B, of a disk C, fast on shaft A, a disk D, loose thereon and provided with a radial slot $e$, an eccentrically-arranged shaft H, a plate or arm F thereon, carrying a pin E entering the slot $e$ of disk D, and gearing, substantially as specified, connecting the plate F with the driving-shaft, said disks C D having a graduated scale S and mark or pointer R, substantially as herein set forth.

4. The combination, with a driven shaft A and a driving-shaft B, of geared feed-rolls and geared cutter-rolls, a plate D, loose on the shaft A and provided with a radial slot $e$, means, substantially as specified, for coupling the plate D and shaft A, an eccentrically-arranged shaft H, a disk or arm F thereon, having a pin E entering the slot $e$ of plate D, and driving-gearing connecting the disk F and shaft B, substantially as described, whereby the speed of the knife-carrying roll on the shaft A may be regulated to cleanly cut into different lengths a web of paper or other material traveling at the different speeds of the feed-rolls, as herein set forth.

ARTHUR SCOTT.

Witnesses:
CHAS. F. MEYER,
JOHN LITTLE.